US010402506B2

(12) United States Patent
Bumbalough et al.

(10) Patent No.: US 10,402,506 B2
(45) **Date of Patent: *Sep. 3, 2019**

(54) METHOD, COMPUTER PROGRAM PRODUCT AND APPARATUS FOR PROVIDING A BUILDING OPTIONS CONFIGURATOR

(71) Applicant: ILLINOIS TOOL WORKS, INC., Glenview, IL (US)

(72) Inventors: Steven Eugene Bumbalough, Arlington, TX (US); Gary Ned Sharp, Lewisville, TX (US); Scott Paul Babin, Allen, TX (US); Cathrine Hill, Tabernacle, NJ (US)

(73) Assignee: Illinois Tool Works, Inc., Glenview, IL (US)

( * ) Notice: Subject to any disclaimer, the term of this patent is extended or adjusted under 35 U.S.C. 154(b) by 569 days.

This patent is subject to a terminal disclaimer.

(21) Appl. No.: 15/001,749

(22) Filed: Jan. 20, 2016

(65) Prior Publication Data

US 2016/0210377 A1 Jul. 21, 2016

Related U.S. Application Data

(60) Provisional application No. 62/105,288, filed on Jan. 20, 2015.

(51) Int. Cl.
*G06F 17/50* (2006.01)

(52) U.S. Cl.
CPC ...... *G06F 17/5004* (2013.01); *G06F 2217/02* (2013.01); *G06F 2217/06* (2013.01)

(58) Field of Classification Search
CPC ...................................................... G06F 17/50
USPC ............................................................ 703/1
See application file for complete search history.

(56) References Cited

U.S. PATENT DOCUMENTS 5,701,403 A * 12/1997 Watanabe ............... G06T 17/10 345/419
6,922,701 B1 7/2005 Ananian et al.
(Continued)

FOREIGN PATENT DOCUMENTS

EP 2 234 027 A1 9/2010
WO WO 2008/004892 A1 1/2008
(Continued)

OTHER PUBLICATIONS

Pascal, Procedural Modeling of Buildings (Year: 2006).*
(Continued)

*Primary Examiner* — Lechi Truong
(74) *Attorney, Agent, or Firm* — Neal Gerber & Eisenberg LLP

(57) ABSTRACT

Embodiments may provide a method for creating specific three-dimensional building information models and a construction document set, including elevation views, architectural documents, mechanical systems documents, etc. based on user-selected options from a master three-dimensional model element database. A method is provided for generating a building information model, including: deriving three-dimensional building information model elements, where each of the building information model elements is part of an options set for a building; providing for display of the building information model elements in an options grid of an options configurator application, where each building information model element is presented in a cell of the options grid; associating options rules with the building information model elements; and receiving selection of two or more building information model elements.

18 Claims, 16 Drawing Sheets

(56) References Cited

U.S. PATENT DOCUMENTS

| | | | | |
|---|---|---|---|---|
| 7,620,525 | B2 | 11/2009 | Denny et al. | |
| 7,747,483 | B1 | 6/2010 | Puerini et al. | |
| 8,452,674 | B2 | 5/2013 | Puerini et al. | |
| 8,825,458 | B2 | 9/2014 | Bumbalough et al. | |
| 2007/0276639 | A1* | 11/2007 | Montaron | G01V 11/00 703/10 |
| 2008/0208654 | A1 | 8/2008 | Nahikian et al. | |
| 2010/0070241 | A1 | 3/2010 | Opdahl et al. | |
| 2010/0198563 | A1 | 8/2010 | Plewe | |
| 2011/0054857 | A1* | 3/2011 | Moguchaya | G01V 99/00 703/2 |
| 2011/0082701 | A1 | 4/2011 | Sagar | |
| 2011/0218772 | A1 | 8/2011 | Bumbalough et al. | |
| 2013/0211795 | A1* | 8/2013 | Vanker | G06F 17/5004 703/1 |

FOREIGN PATENT DOCUMENTS

| | | | |
|---|---|---|---|
| WO | WO 2008/078337 | A1 | 7/2008 |
| WO | WO 2011/109268 | A1 | 9/2011 |

OTHER PUBLICATIONS

Cadsoft "Envisioneer 2.5 Quick Start Guide", 2004, Cadsoft Corporation.

Communication Pursuant to Rules 161(1) and 162 EPC; dated Oct. 10, 2012.

Medjdoub, B., et al.; "Separating topology and geometry in space planning"; Computer-Aided Design; vol. 32; No. 1; Jan. 1, 2000; pp. 39-61.

Office Action for Canadian Patent Application No. 2,789,477 dated Apr. 7, 2015.

Office Action for Canadian Patent Application No. 2,789,477 dated Mar. 11, 2014.

Search Report and Written Opinion for International Application No. PCT/US2011/026426, completed May 20, 2011; 12 sheets.

Office Action for Canadian Patent Application No. 2,789,477 dated Apr. 4, 2016.

Anonymous, "Architectural Design Software Solution," Jan. 17, 2015, pp. 1-16, XP055267754, Allen, Texas, USA, Retrieved from the Internet: URL: http://web.archive.org/web/20150117064700/http://www.visionrez.com/PDF/VisionREZ_ProductGuide_USA_Email.pdf, [retrieved on Apr. 22, 2016].

International Search Report and Written Opinion for International Application No. PCT/IB2016/050280, completed May 10, 2016; 16 sheets.

Canadian Office Action for Canadian Application No. 2,970,755 dated Mar. 6, 2019 (4 pages).

Merrell et al., "Computer-Generated Residential Building Layouts", ACM Transactions on Graphics, vol. 29, No. 6, pp. 181:1-181:12, Dec. 31, 2010 (11 pages).

* cited by examiner

METHOD, COMPUTER PROGRAM PRODUCT AND APPARATUS FOR PROVIDING A BUILDING OPTIONS CONFIGURATOR

CROSS-REFERENCE TO RELATED APPLICATIONS

This application claims priority to U.S. Provisional Application Ser. No. 62/105,288, filed on Jan. 20, 2015, the contents of which are herein incorporated by reference in their entirety.

TECHNOLOGICAL FIELD

Embodiments of the present invention relate generally to computer aided design technology and, more particularly, relate to a method, computer program product and apparatus for providing a Building Options Configurator for use in connection with computer aided design and building information modeling.

BACKGROUND

The modern construction era has brought about a tremendous expansion of the use of technology and computers in connection with designing and building structures of all types. Full size geometrically accurate 3D Building Information Modelling (BIM) represents one area that has fueled the expansion of the integration of computers into areas such as building design. In this regard, 3D BIM may be used to increase the productivity and capability of architects and draftsmen to virtually design full sized 3D buildings, address conflicts and resolutions during the design phase, and produce corresponding construction documents and engineering drawings that automatically update based on revisions in the 3D Model.

Production builders are one example of an industry segment that benefits from the advantages that can be offered by 3D BIM. In this regard, for example, production builders typically build a relatively large number of houses from a set of basic plans and then offer various options for buyers to choose from and incorporate into the final configuration of their home according to their budget and desires. Many production builders also have specialized sales staff that work with potential buyers to provide guidance for the presentation and selection of various options. The ability to use a visual selector of these various options and see how their choices affect the look of their new home is very attractive to home buyers who wish to customize their house to some degree. However, the provision of options also carries inherent risk for both profit or loss for builders. In this regard, for example, some options may be relatively simple to implement or at least may not present problems when actually building a structure, while other options may significantly complicate the building process and may lead to cost overruns that may severely damage the builder's bottom line. The greatest risk is complete and accurate communication of the resulting building parts based on these selected options to the downstream trade engineers, suppliers, installers, and CNC driven building fabricators. These prefabricated steel and wood building components, if generated incorrectly from the 3D BIM model, have to be modified or completely remanufactured with new parts being shipped to the construction site at tremendous expense and delay to the project. Such costly mistakes are avoided when the proper 3D configuration of all 3D building parts are assembled correctly based on the options selected by the building purchaser.

BRIEF SUMMARY

Embodiments of the present invention may provide a method for creating specific three-dimensional building information models and a construction document set, including elevation views, architectural documents, mechanical systems documents, etc. based on user-selected options from a master three-dimensional model element database. According to an example embodiment, a method is provided for generating a building information model, including: deriving three-dimensional building information model elements, where each of the building information model elements is part of an options set for a building; providing for display of the building information model elements in an options grid of an options configurator application, where each building information model element is presented in a cell of the options grid; associating options rules with the building information model elements; and receiving selection of two or more building information model elements. According to some embodiments, one or more of the option rules associated with at least one of the two or more building information model elements may be applied to the respective at least one of the two or more building information model elements, and combining and modifying each of the two or more building information model elements may be performed to generate a building information model.

According to some embodiments, the method may optionally include deriving one or more views of the generated building information model. Methods may include deriving plans for one or more mechanical systems for the generated building information model. One or more application-specific computer-numerically-controlled files may be derived for manufacturing one or more components of the building information model. The one or more option rules may include a restriction on an interface between two of the two or more building information model elements. The options grid may include two or more grids each presented as a level in a three-dimensional stacked arrangement, where each level of the three-dimensional stacked arrangement is a story of the building. Combining and modifying each of the one or more building information model elements may include modifying the at least one of the two or more building information model elements according to an associated option rule, and combining the at least one of the two or more building information model elements with the others of the two or more building information model elements to generate the building information model. Methods may optionally include simulating energy usage of the building information model based on a geometry of the three-dimensional mode, geolocation information, and a building orientation relative to solar paths.

Embodiments of the present invention may provide a method executable by a processor including: receiving an indication of a hierarchical structure of building information model element options applicable to an enterprise; receiving options rules defining relationships between building information model element options within the hierarchical structure; and providing a visual representation of the building information model element options, where the visual representation includes two or more arrays of cells presented in a stacked three-dimensional view. Each building information model element option may reside in respective cell of the arrays.

According to some embodiments, in response to a first option from a first one of the two or more arrays of cells being selected and a second option from a second one of the two or more arrays of cells being selected, methods may generate an assembled three-dimensional building information model of a building including the first option and the second option. Methods may include simulating energy usage of the assembled three-dimensional building information model based on a geometry of the three-dimensional model, geolocation information, and a building orientation relative to solar paths. Methods may include generating at least one of a plumbing model, an electrical model, or a duct work model for the assembled three-dimensional building information model in response to the first option and the second option being selected.

According to some embodiments, in response to a third option from the first one of the two or more arrays being selected, methods may include generating an assembled three-dimensional building information model of a building including the third option and the second option, and generating a revised version of the at least one of a plumbing model, an electrical model, or ductwork model. The building plan options presented in the two or more arrays of cells may be determined in response to building options previously selected. Each of the two or more arrays of cells may represent a building level, where the two or more arrays may be presented in a stacked, three-dimensional view indicative of the relative position of the building levels with respect to one another. Methods may include solving for at least one of a plumbing model, an electrical model, or a ductwork model, for each combination of options presented in the two or more arrays of cells.

BRIEF DESCRIPTION OF THE SEVERAL VIEWS OF THE DRAWINGS

Figure 1:
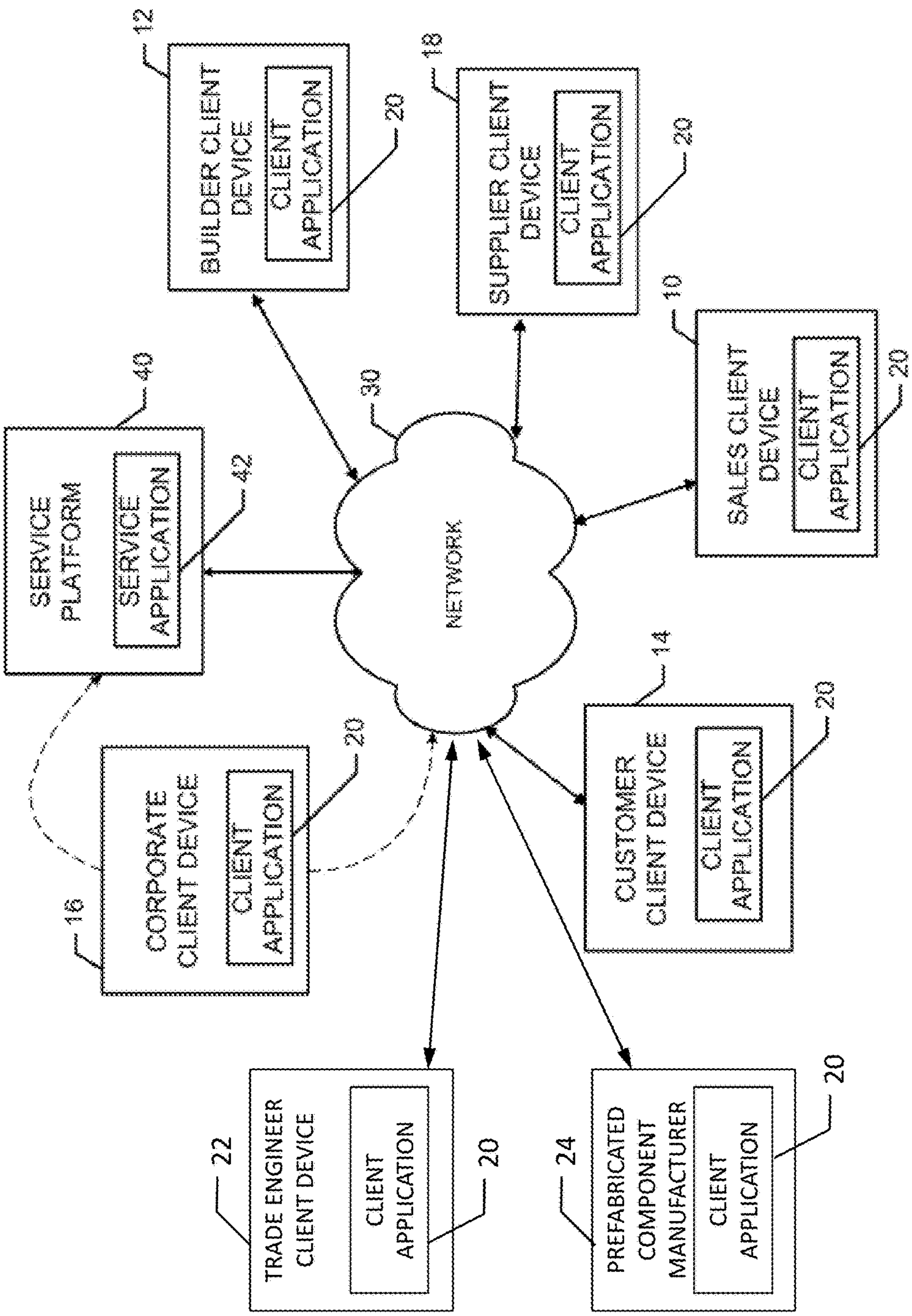
Figure 2:
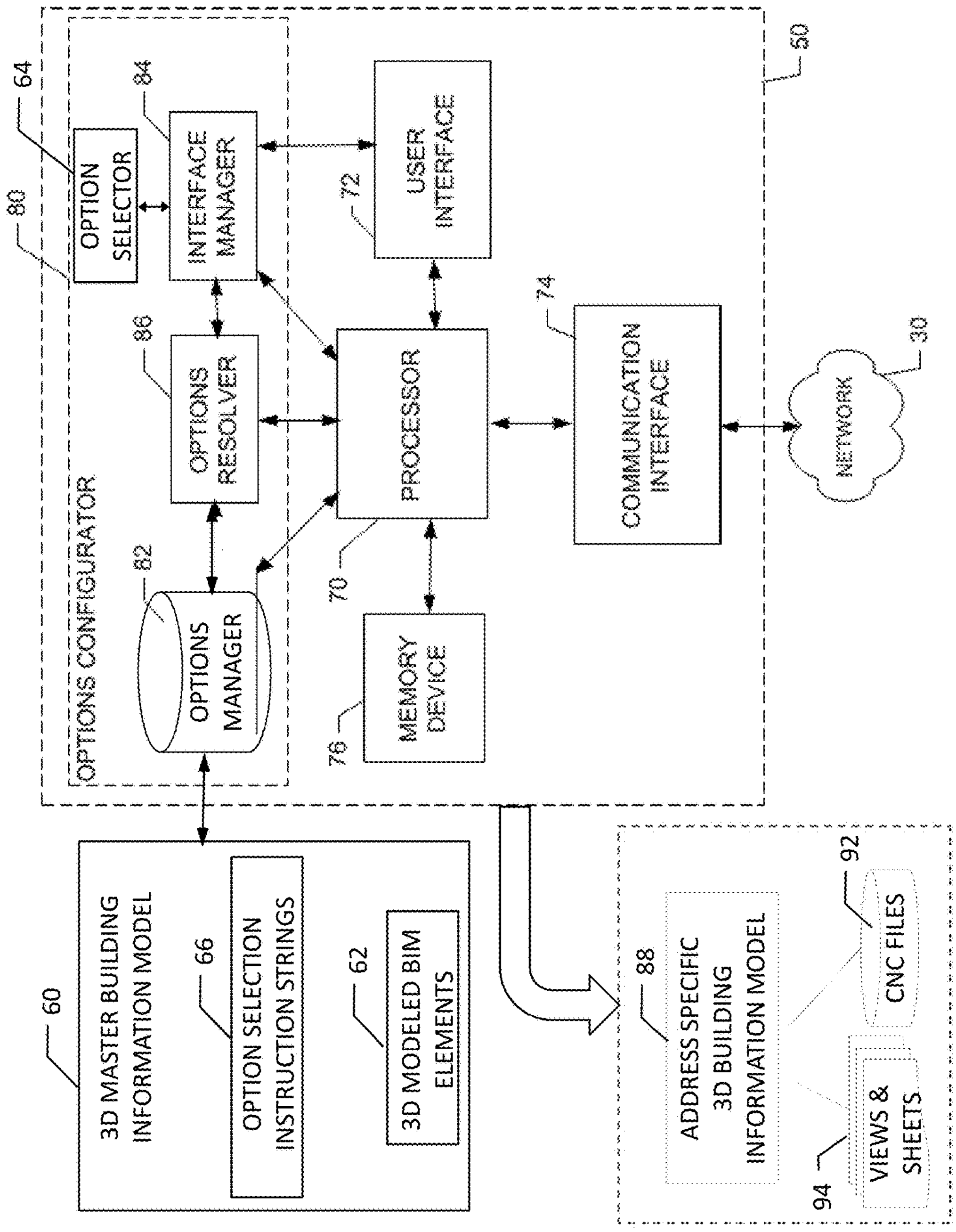
Figure 3:
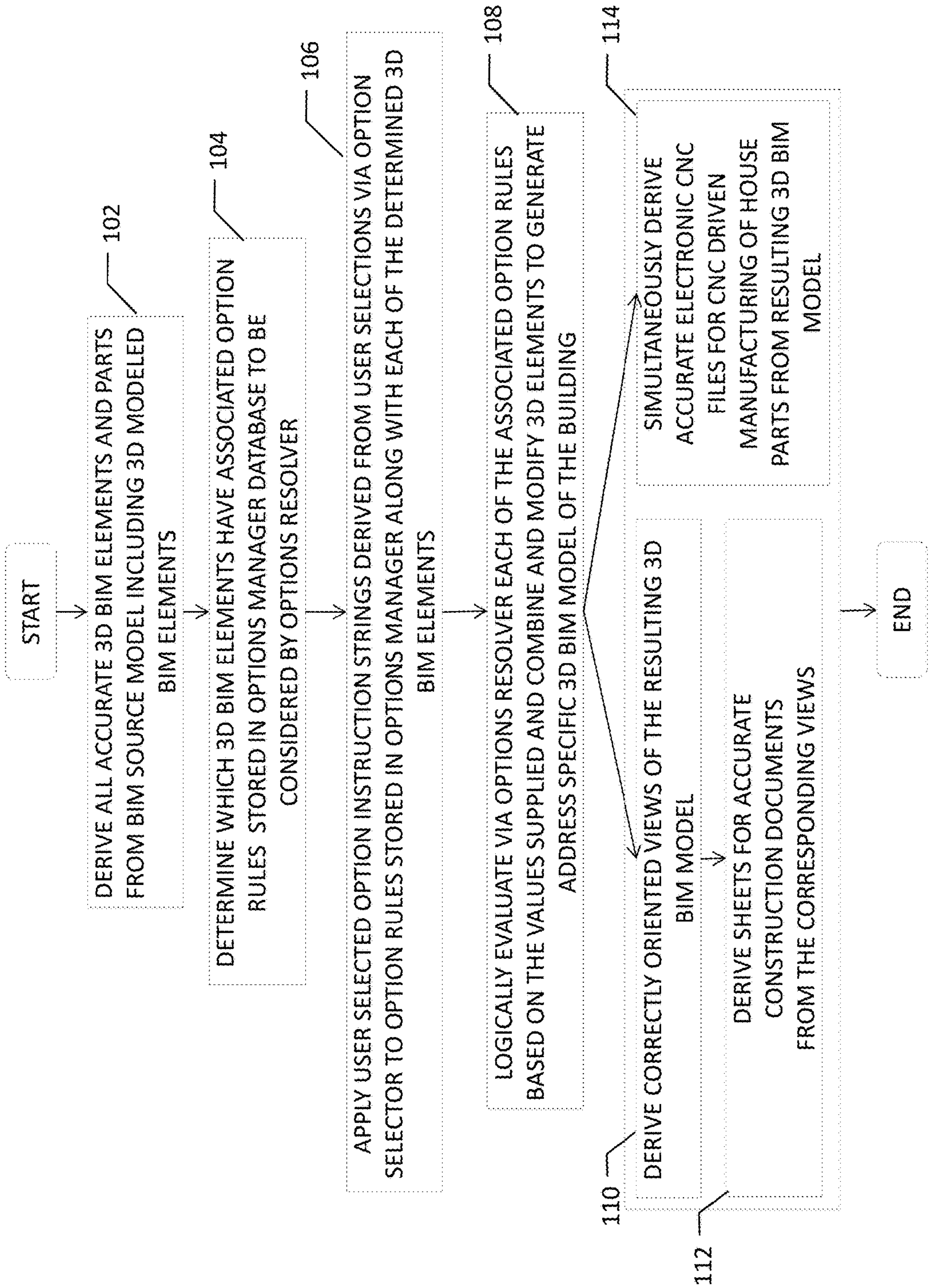

Having thus described embodiments of the invention in general terms, reference will now be made to the accompanying drawings, which are not necessarily drawn to scale, and wherein:

FIG. 1 is a schematic block diagram of a communication system according to an example embodiment of the present invention;

FIG. 2 is a schematic block diagram of an apparatus for providing an options configurator according to an example embodiment of the present invention;

FIG. 3 is a block diagram flowchart of the method of an example embodiment of an options configurator that generates the address location/lot specific 3D building parts.

Figure 4:
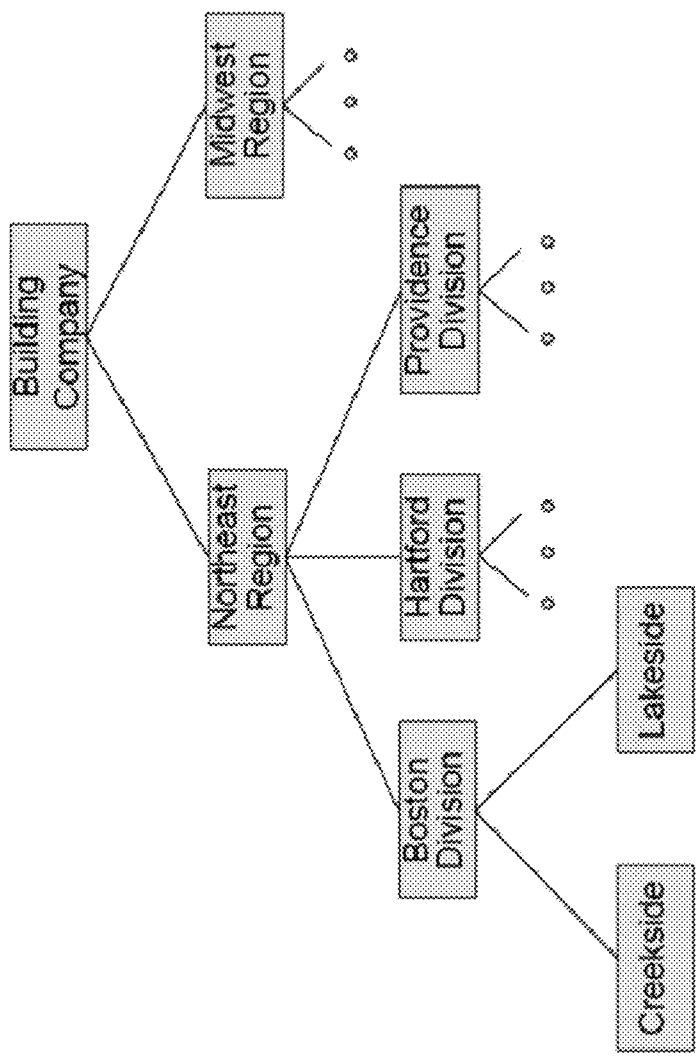
Figure 5:
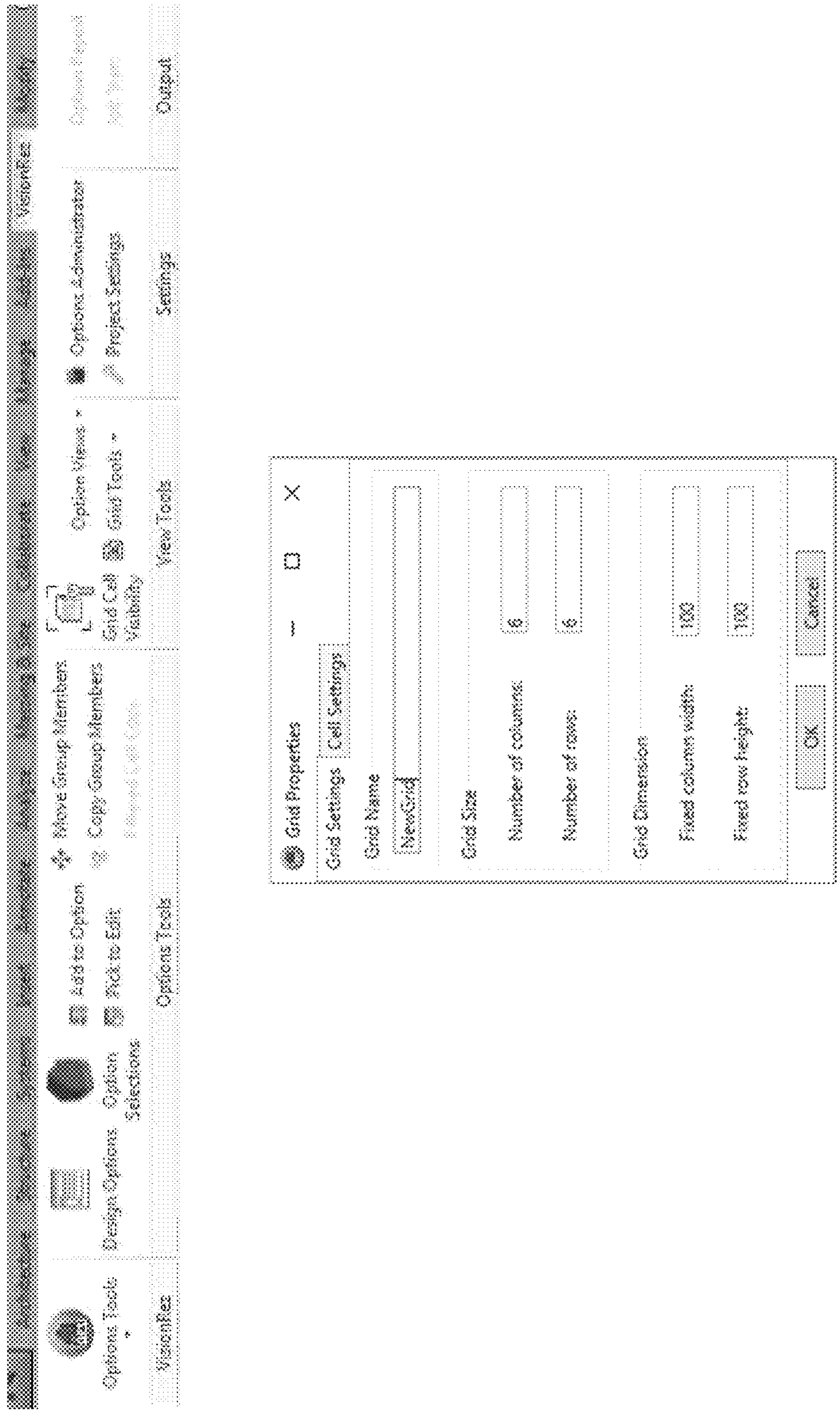
Figure 6:
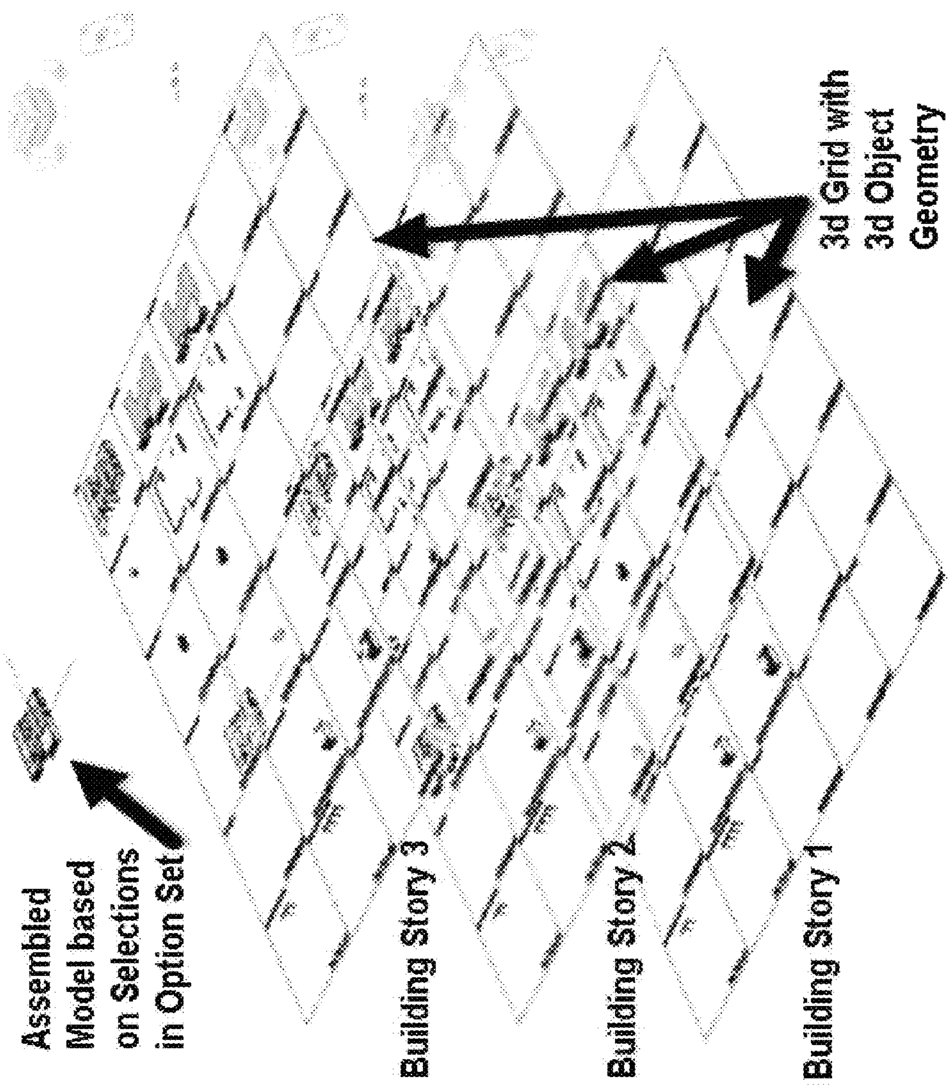
Figure 7:
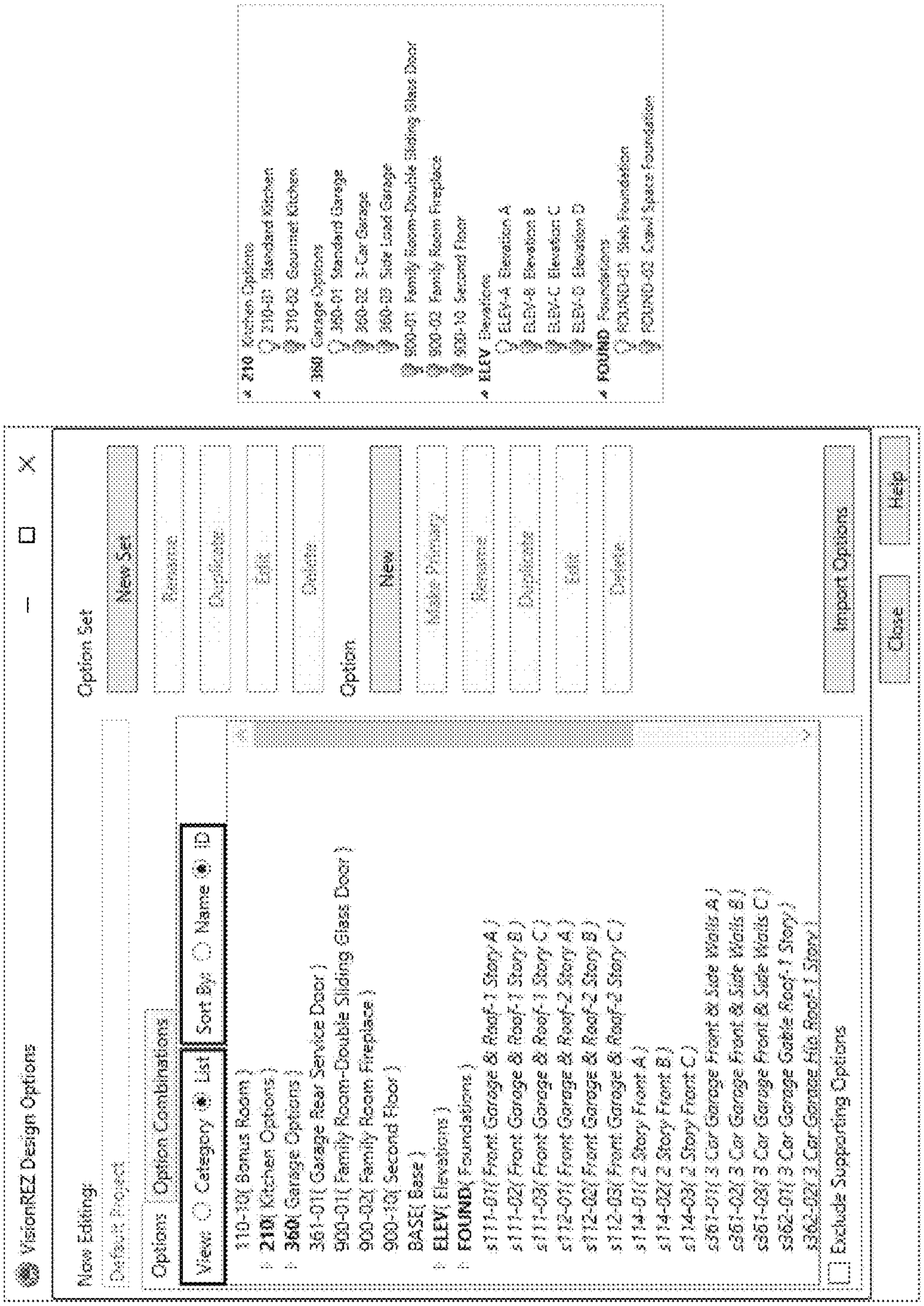
Figure 8:
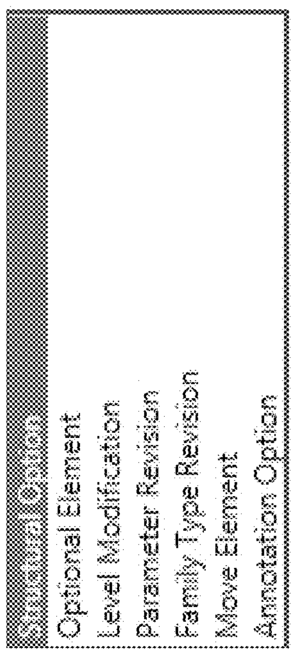
Figure 9:
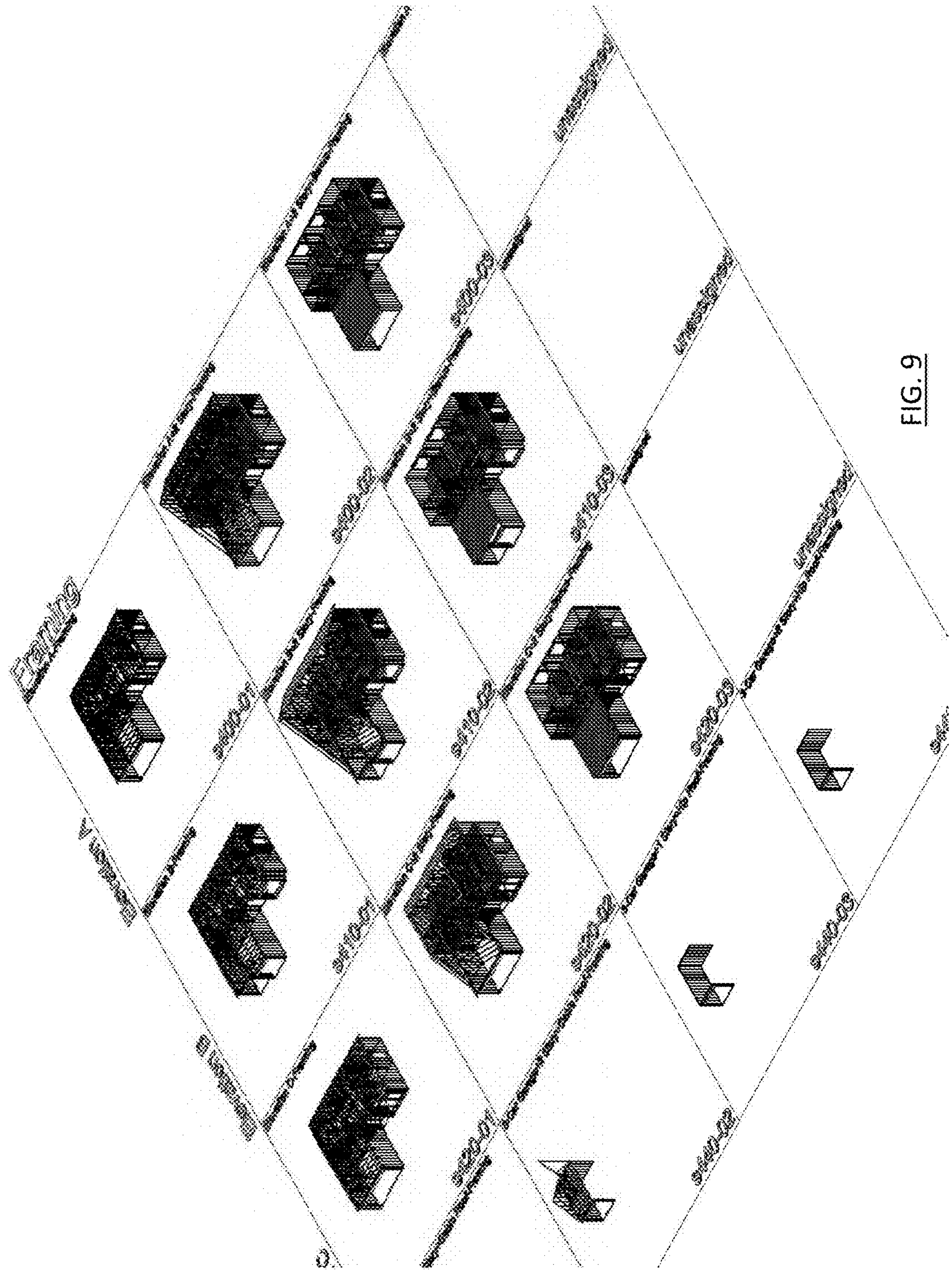
Figure 10:
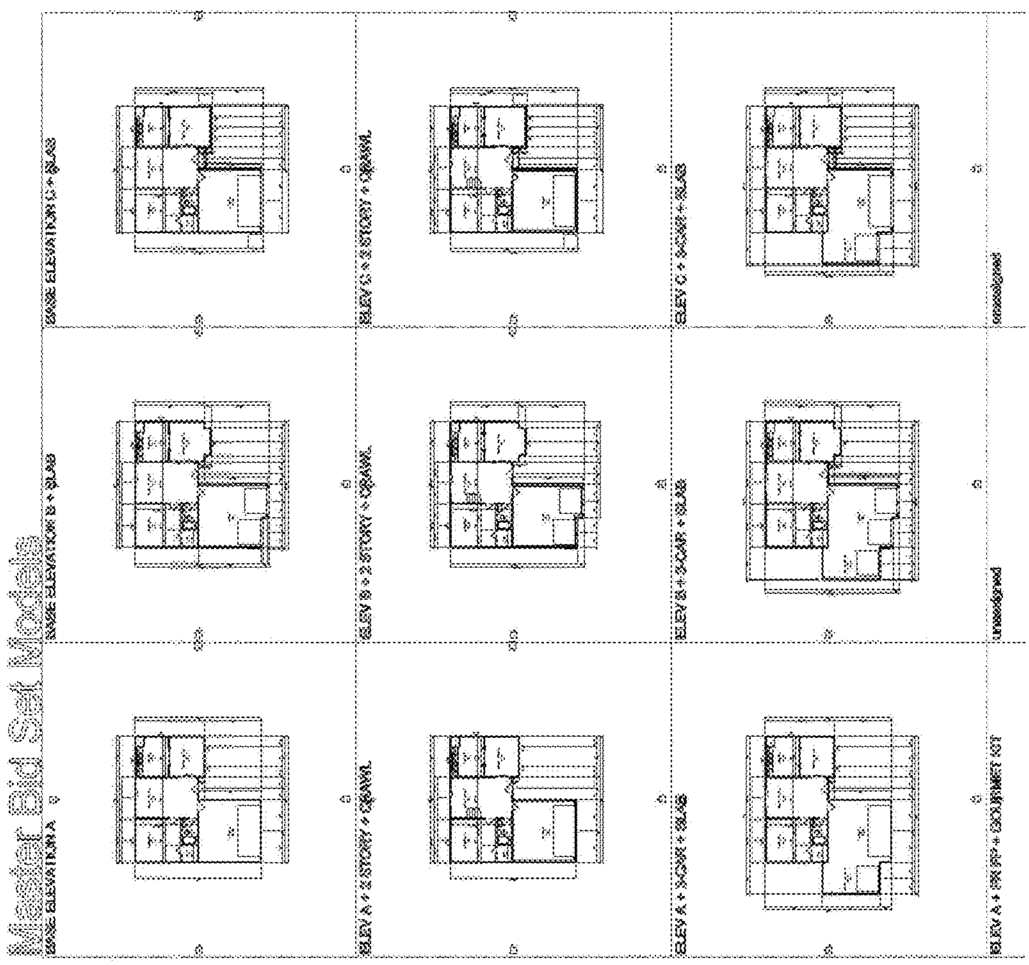
Figure 11:
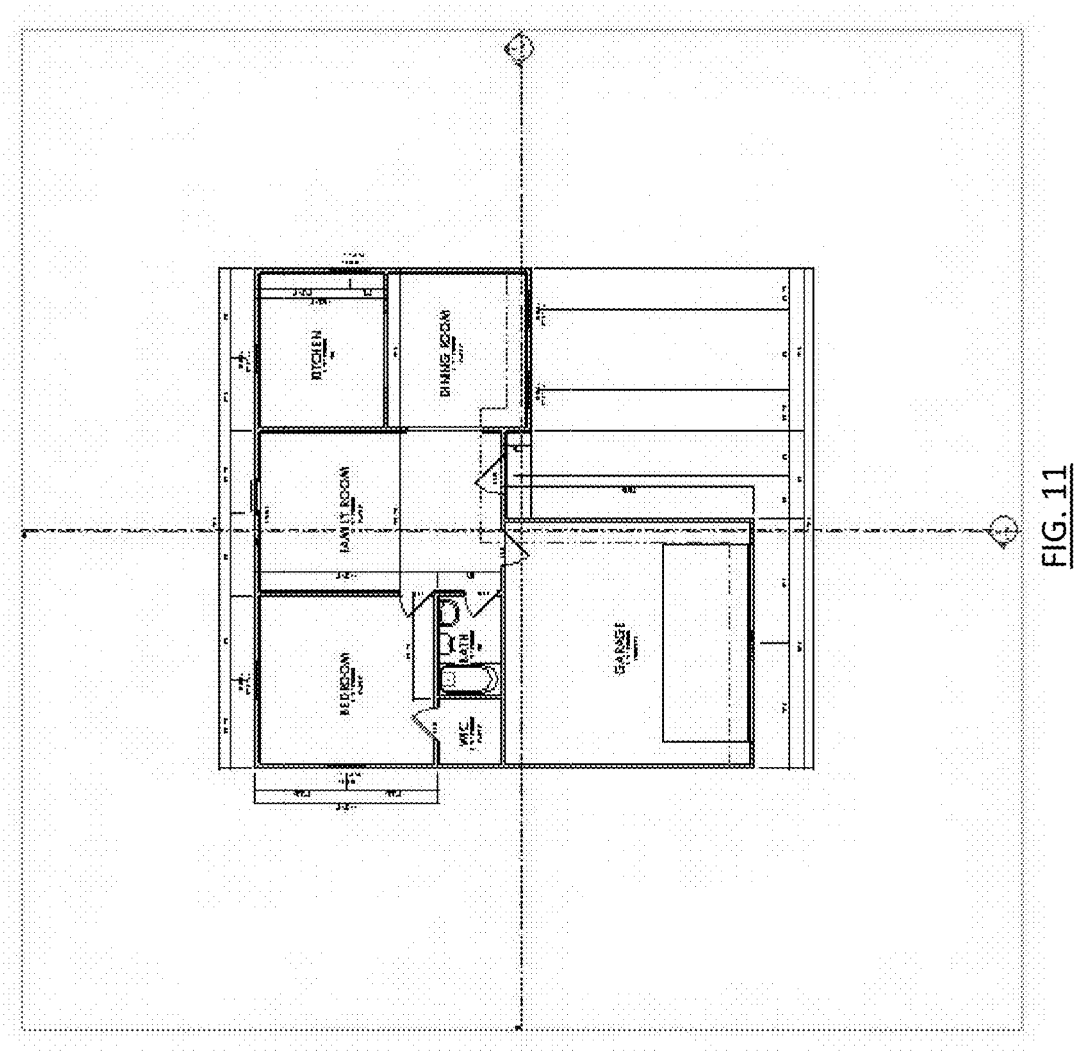
Figure 12:
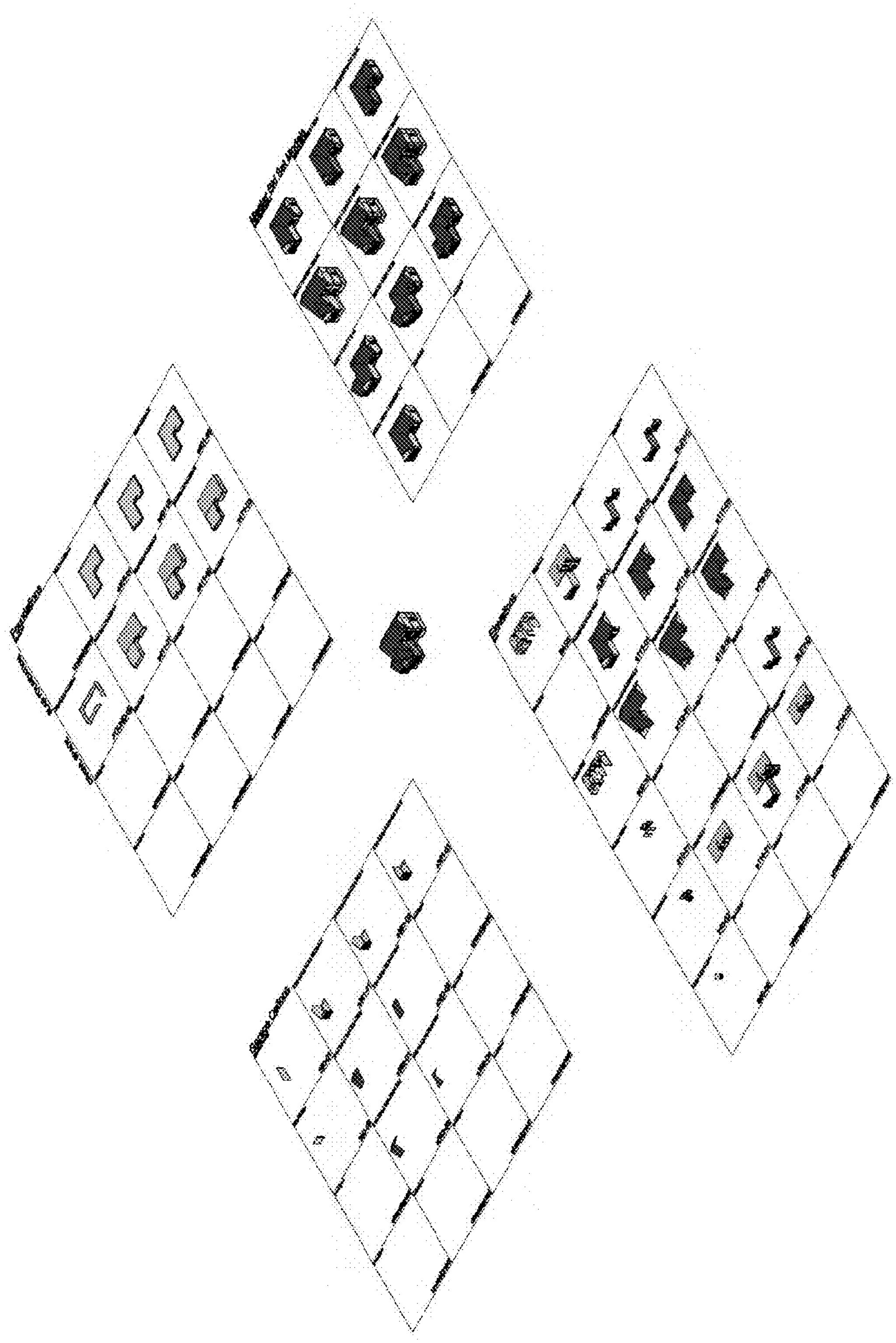
Figure 13:
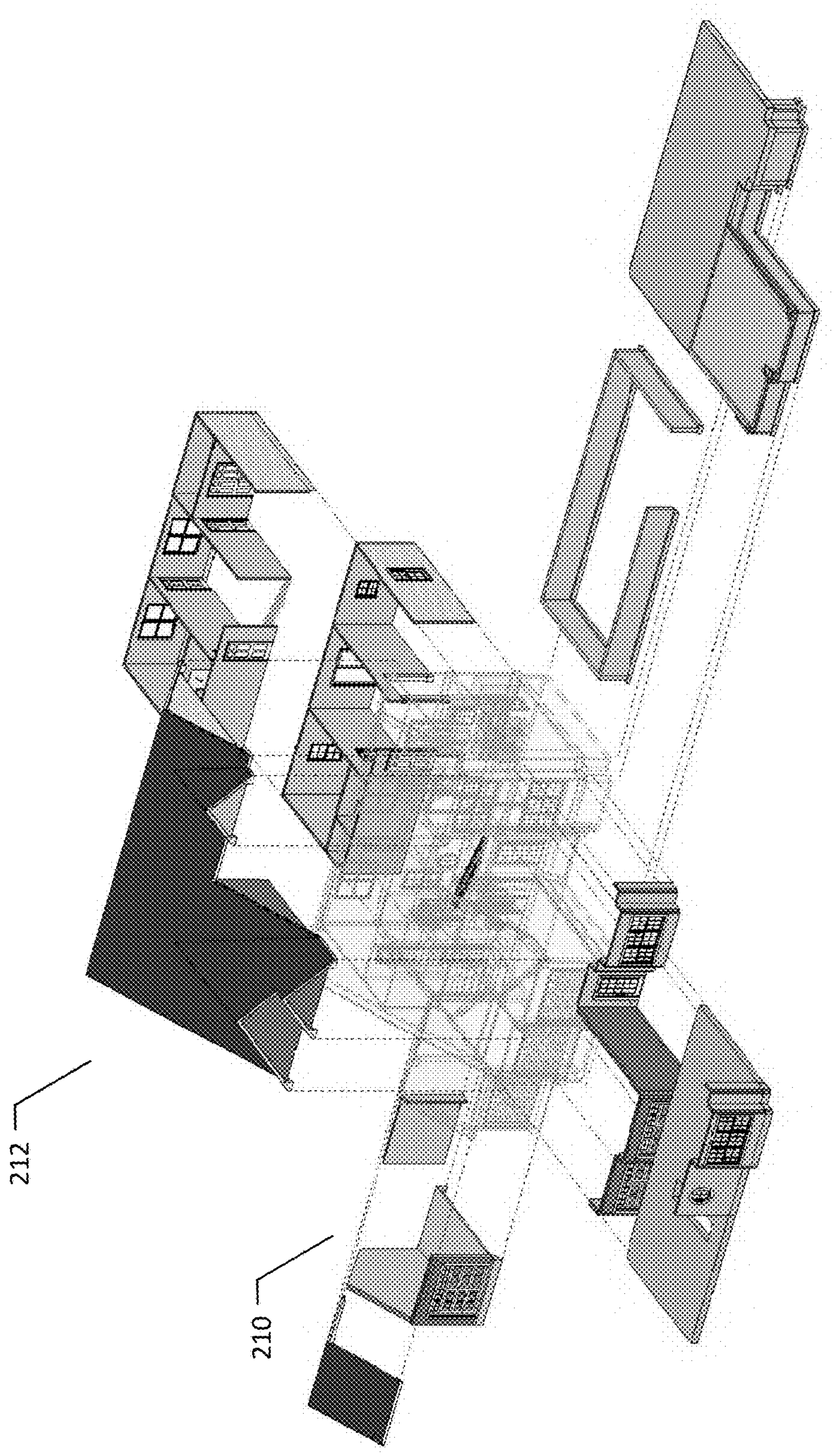
Figure 14:
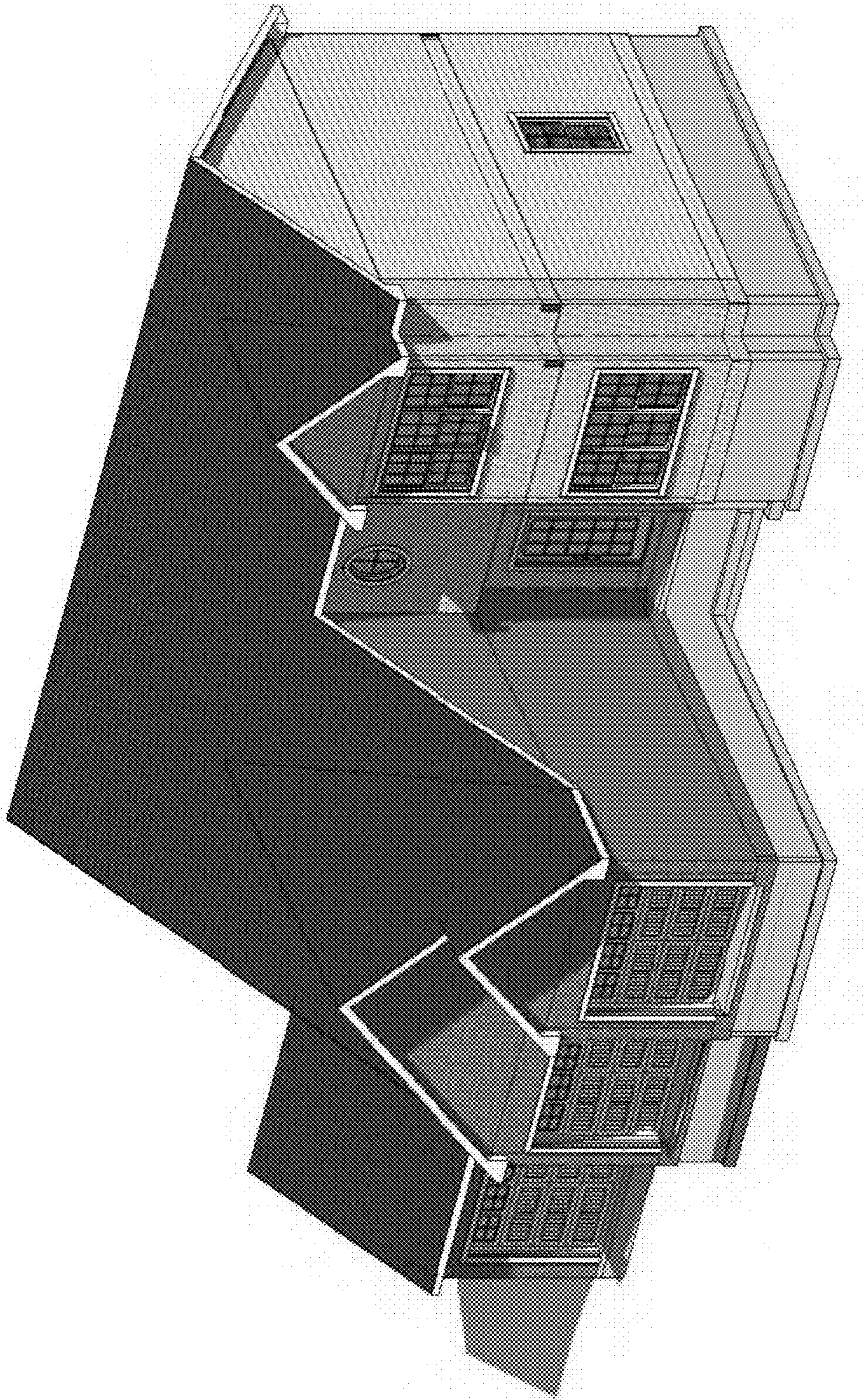
Figure 15:
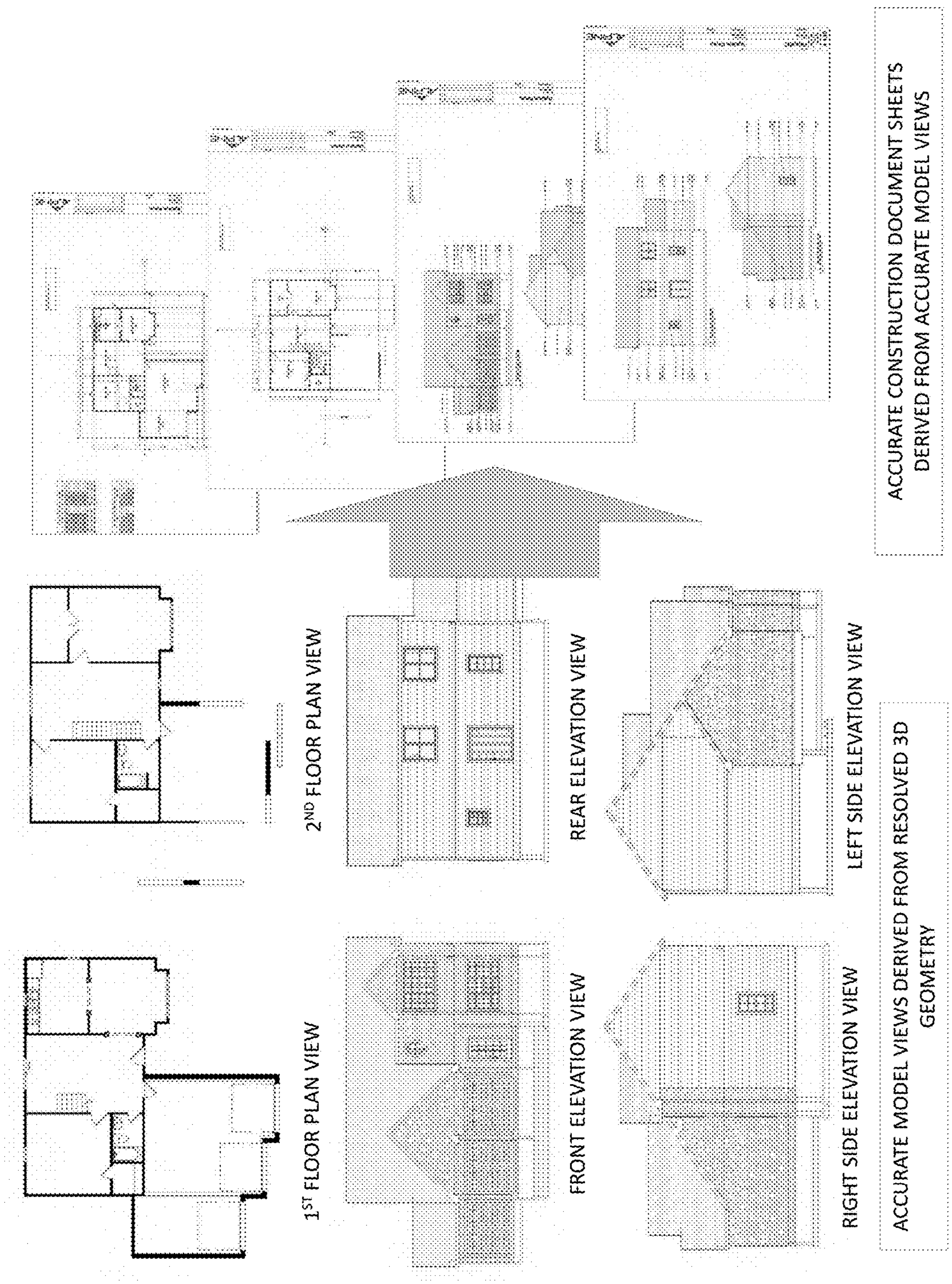
Figure 16:
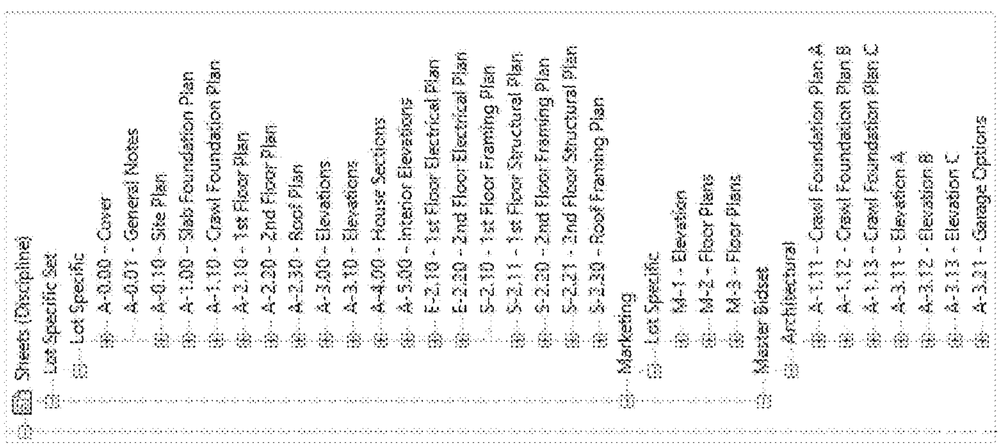

FIG. 4 illustrates a production builder hierarchy that limits specific option availability based on the rules established at each level in the organization according to an example embodiment of the present invention;

FIG. 5 illustrates a user interface ribbon and a Grid Properties control for a CAD software environment according to an example embodiment of the present invention;

FIG. 6 illustrates a multi-level 3D options grid according to an example embodiment of the present invention;

FIG. 7 illustrates an option selection user interface at the project level according to an example embodiment of the present invention;

FIG. 8 depicts option types for a builder according to an example embodiment of the present invention;

FIG. 9 illustrates an enlarged view of one quadrant of the options grid according to an example embodiment of the present invention that depicts various wood framing configurations;

FIG. 10 illustrates the simultaneous generation of Master Bid Sets of Construction documents used for Bid purposes that indicate many of the option combinations and resulting sheets according to an example embodiment of the present invention;

FIG. 11 depicts the resulting accurately dimensioned floor plan of an address specific model based on premise that all walls, windows, doors, etc. have been assembled accurately and dimensioned automatically based on the resulting building according to an example embodiment of the present invention;

FIG. 12 illustrates a lot specific model solve box according to an example embodiment of the present invention;

FIG. 13 depicts an exploded view of the complex geometry typically required to assemble various house parts into a complete home based on the customer selected options according to an example embodiment of the present invention;

FIG. 14 depicts a complete assembled address specific 3D Model as generated from the correct parts and rules that contains the accurate shapes and geometry necessary for post processing to create construction documents, CNC files for manufacturing, and accurate bills of material according to an example embodiment of the present invention;

FIG. 15 is a graphic representation of the flow process for derivation of address specific Plan and Elevation Views which are in turn used to derive and annotate the output of Sheets in the form of Construction Documents as one output from the system according to an example embodiment of the present invention; and FIG. 16 illustrates multiple resulting views of the various option combinations resolved at one time with the building configurator for placement directly on sheets for blueprints and construction documentation according to an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Furthermore, as defined herein a "computer-readable storage medium," which refers to a physical storage medium (e.g., volatile or non-volatile memory device), can be differentiated from a "computer-readable transmission medium," which refers to an electromagnetic signal.

As indicated above, embodiments of the present invention relate to the provision of an options configurator. More specifically, embodiments described herein may be configured to function in a collaborative manner with existing CAD software to enhance the efficiency, flexibility, and consistency with which buildings are created in a CAD environment. Embodiments described herein provide a solution for generating an unlimited combination of Option Sets within a building model to drive a database that can be integrated with existing CAD software, such as the Revit Building Information Modeling solution by Autodesk®. Some embodiments of the solutions provided herein employ a unique three-dimensional (3D) grid to build a visual representation of a database of options and option sets rather than the CAD objects themselves.

Options configurators for management of options integration have been developed that aim to assist builders in presenting and providing various options to potential buyers in a way that is attractive to buyers, but is also useful for the builder. However, existing options configurators may rigidly apply predetermined options using static graphic images and 2D CAD representations of the building and therefore have limited flexibility and adaptability when it comes to resolving the final geometric 3D shapes of the various parts of the house. However, Applicant has developed an options configurator for which complicated options and option combinations can be resolved consistently, efficiently, and accurately in the 3D Model.

Option combinations for an address specific structure may include relatively simple options, such as when a door or window may be added to a wall; however, option combinations can also be substantially more complex. An example of such complexity can be, but is not limited to, when a bonus room, which raises the roof of the structure, is added in combination with a 3 car garage, which simultaneously lengthens the structure. Such combinations must be configured and resolved in order to modify the Base 3D Model according to the customer's selections. These option combinations affect one another, and when chosen in combination affect the configuration of the foundation and the structural frame of the building. The resulting 3D configuration can severely revise the output of accurate 2D construction documents, CNC fabrication files for manufacturing building components, and generation of accurate bills of material for the entire project, for example. Addition of such certain options, such as adding rooms, garages, walls, cathedral ceilings, or other geometrically diverse building parts can cause other building parts to be moved or omitted based on the particular combination of options selected.

Other options may include mirroring a house from a left hand garage to a right hand garage which may require the layout, marking, and cutting of individual framing members inside walls, for example, to be regenerated in 3D from the opposite end of the wall in order for CNC manufacturing generated from the 3D Model to be correct based on the selected options. This repositioning of structural members such as studs must be considered when laying out the anchor bolts for the concrete foundation in order to avoid interferences with anchor bolts and plumbing stub ups previously embedded in the concrete. Without such resolution of all 3D geometric shapes in the BIM model, inaccurate reconfiguration and representation of the 3D model generates erroneous information that may have costly results for rework of manufactured building components. These full geometric revisions and resolutions based on various combinations of options significantly affect the ability to estimate and bid the correct materials required and the labor involved to manufacture and assemble the final structure.

Further combinations may involve even greater complexity based on rules that may force other changes based on parametric constraints that control the 3D model. For example, an option combination may change the shape of the building such that the structural framing direction is rotated making different walls load bearing and requiring a thickening and redesign of the slab foundation below the affected wall. An option that changes the height of a wall significantly can force the redesign of the structural framing to resist the larger area of the wall subject to wind or seismic loads generated on the building. An option that changes the width of a building may result in the structural floor framing being insufficient to span the revised distance requiring stronger floor members to be used or changes to the on-center spacing of the joists. These revisions cannot be detected by simply pasting together 2D static images or configurations that do not and cannot take into account the revision of the building geometry and its effect on the structure of the building. The building options configurator described herein accommodates such complexities of building design where option upon option combinations generate vastly different 3D geometry within the resulting BIM model.

Example embodiments provide a building configurator for use with existing CAD software to provide a 3D grid representation to manage unique combinations of design option data-driven geometry. This enables a user to visually configure an unlimited number of database driven 3D building configurations using a minimal number of geometric elements visually displayed in a 3D grid layout. Users may associate different selections among multiple option set combinations with corresponding different entities within the configurator and provide for generation of building information models and their derivatives based on selected options within multiple design option sets. Embodiments described herein may be implemented in a stand-alone architecture with CAD software, or implemented as a "plug-in" to an existing CAD software program. While existing CAD software architectures may address individual option sets, none provide an easy solution for various combinations of option sets, much less the visual interfaces provided herein by example embodiments. Further, the complexities of integrating the options selected through the grid-style visual user interface may be resolved through the options configurator of example embodiments described herein.

Buildings and their respective building models or plans consist of 3D objects that are typically associated with multiple stories or levels within the building. Building configurations driven by various option combinations affect multiple levels and systems in a building simultaneously. Conventional 3D building configurators may take into account the variants in the building design option combinations in a two-dimensional (2D) approach (i.e., X- and Y-axes). In contrast, embodiments described herein implement a 3D grid apparatus within the 3D building modeling software to enable a user to configure multiple levels while at the same time addressing the third axis (i.e., the Z-axis) to provide true 3D modeling.

Two dimensional option management solutions may use a "stacked" approach or a "fence and move" approach. In the stacked approach, objects are stacked on top of one another and switched off and on in a similar fashion to conventional CAD drawing layer management. The "fence and move" approach has a user draw optional pieces of floor plan in small vignettes in a scattered fashion around the model space environment. Neither of these approaches operates in a clean visual environment where the user can focus in on specific areas of the building and test various configurations in a clear 3D fashion that allows the user to see the effects on other levels in the building. Accordingly, embodiments described herein enable real-time rotational and spin features for the building configuration that result from the selected option choices.

Example embodiments can thus address building configuration variations in multiple systems including architectural, structural, HVAC, electrical, and piping. At the same time, with the ability to quickly generate real-time 3D building configurations of all or a portion of the building with all of these building systems intact, one can see the effect of changing the structural framing based on various design options and how it affects piping or ductwork system interaction. Embodiments of the present invention may provide real-time clash detection between architectural, structural, and Mechanical-Electrical-Plumbing (MEP) objects comprising Mechanical (e.g., HVAC ductwork routing), Electrical (e.g., conduit routing), and Plumbing (e.g., water or gas line routing) objects. The real-time clash detection may illustrate where the MEP objects penetrate building walls, floors, ceilings, and roofs, and interfere with structural elements such as beams and columns. Embodiments of the solution described herein use a database that drives these parametric objects and reports precise location, geometry, and other attributes for structural analysis, energy analysis, lighting simulations, etc., based on the variants selected by a user.

Embodiments of solutions described herein enable certain derivative functions to become available by simultaneously solving for multiple 3D building option combination configurations. Energy usage simulations can be performed through the use of building orientation modeling with respect to solar paths and geo-location information in combination with the various building configurations, thus allowing quick simulation of energy usage based on the unique option combinations selected. Quantity takeoffs may be readily derived based on the unique option combinations solved by taking into account options on multiple levels that may affect the entire structure. Computer-numerically-controlled (CNC) manufacturing of building components may be derived from the building configurator based on the generation of custom instructions for manufacturing site-specific building components based on the variants selected.

Embodiments of the present invention may be offered via a network environment so that various different terminals may access functionality associated therewith. As such, various (sometimes remotely located) client terminals may access a service platform capable of serving information to each respective client terminal in accordance with example embodiments. In some cases, the service platform may host a web application that is accessible by the client terminals or may host a service application that interacts with a corresponding client application at each respective client terminal. However, in alternative embodiments, an application may be executed at one or more of the client terminals in a stand alone mode using updateable software that may run on the client terminal. Other architectures for supporting deployment of embodiments of the present invention are also possible. However, an example architecture will be described in connection with FIG. 1 to illustrate an example embodiment.

FIG. 1 illustrates a generic system diagram in which a device such as a mobile terminal or substantially stationary computer 10, which may benefit from embodiments of the present invention, is shown in an example communication environment. As shown in FIG. 1, an embodiment of a system in accordance with an example embodiment of the present invention may include one or more client terminals. In some cases, the client terminals may be associated with different entities that may interact with embodiments of the present invention. Thus, for example, a sales client device 10, a builder client device 12, a customer client device 14, a trade engineer client device 22, a prefabricated component manufacturer client device 24, and a corporate client device 16 may each be examples of client terminals associated with respective different entities. Each of the client terminals may be a computer, access terminal, or other device capable of executing an application (e.g., client application 20) according to an example embodiment of the present invention. As such, in some cases, the client terminals may even be mobile terminals such as laptop computers, tablets, or smart phones.

In an example embodiment, the client terminals may be capable of communication with a network 30 that may link each client terminal to other client terminals and/or to a service platform 40. The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of wireless communication protocols. Alternatively, the network 30 may include communication interfaces supporting landline based or wired communication via fixed access mechanisms such as digital subscriber line (DSL), cable modems, Ethernet and/or the like. As such, the network 30 may be part of a data network, such as a local area network (LAN), a metropolitan area network (MAN), and/or a wide area network (WAN), such as the Internet. By directly or indirectly connecting the client terminals and/or the service platform 40 and other devices to the network 30, the client terminals and/or the service platform 40 may be enabled to communicate with the other devices or each other, for example, according to numerous communication protocols including Hypertext Transfer Protocol (HTTP) and/or the like, to thereby carry out various communication or other functions of the client terminals and/or the service platform 40, respectively.

In an example embodiment, the service platform 40 may be a device or node such as a server or other processing circuitry. The service platform 40 may have any number of functions or associations with various services. As such, for example, the service platform 40 may be a platform such as a dedicated server, backend server, or server bank associated with a particular information source, function or service. Thus, the service platform 40 may represent one or more of a plurality of different services or information sources. The functionality of the service platform 40 may be provided by hardware and/or software components configured to operate in accordance with known techniques for the provision of information to users of communication devices, except as modified as described herein.

In an example embodiment, the service platform 40 may provide, among other things, a service application 42 configured to provide functionality for an options configurator. Thus, according to some embodiments, the service application 42 may provide a web page interface that may be accessible by the client terminals via execution of a corresponding client application 20 at each respective client terminal. As described above, in some embodiments, the client applications 20 themselves may be enabled to provide an options configurator independent of the service application 42, while in still other alternative embodiments, the service application 42 may provide functionality and information associated with an options configurator to the client terminals via the client applications 20 at each respective client terminal via other client/server related mechanisms.

In an example embodiment, the client applications 20 at each client terminal may be the same. In such examples, the client applications 20 may provide for access restrictions and enablements to different functionalities and/or information sets to clients based on identity or authentication information provided by each potential user. Thus, for example, sales personnel may have corresponding access restrictions and enablements for functionality and information that is pertinent to sales personnel. Meanwhile, corporate personnel may have access to expanded sets of functionality and information based on login information provided by the corporate personnel granting access to administrative functionality and information that is not otherwise accessible to sales personnel. Similarly, customers may be provided with login information or otherwise gain access to an unrestricted portion of a website or functionality provided by the service platform 40 that provides options selection and certain viewing capabilities that are appropriate for customers. Builders may be enabled to access engineering drawings and other information specific to builders' access needs.

As an alternative, different software may be provided in association with each client application 20. As such, for example, software may be loaded onto the sales client device 10 to enable a sales agent to perform only needed functionality, and similarly tailored software may be loadable for each of the other client terminals. In other words, software that is specific to the access and functionality to be granted to a particular entity may be loaded onto the client terminal of each respective entity.

FIG. 2 illustrates a schematic block diagram of an apparatus for enabling the provision of an options configurator according to an example embodiment of the present invention. Some embodiments of the present invention may be embodied wholly at a single device (e.g., the client terminals or the service platform 40) or by devices in a client/server relationship. Furthermore, it should be noted that the devices or elements described below may not be mandatory and thus some may be omitted in certain embodiments. An example embodiment of the invention will now be described with reference to FIG. 2, in which certain elements of an apparatus 50 for providing an options configurator are displayed. The apparatus 50 of FIG. 2 may be employed, for example, on a client terminal (e.g., client device 10, builder client device 12, customer client device 14, and/or corporate client device 16) and/or the service platform 40 or any of a variety of other devices. The apparatus 50 may therefore be a platform for execution of the client application 20 or the service application 42 to the extent that such execution performs the functionality described herein. Thus, for example, the components described in connection with FIG. 2 may form the structure or means by which various functionalities of embodiments of the present invention and functionalities of the client application 20 or service application 42 is executed.

Referring now to FIG. 2, an apparatus 50 for providing an options configurator is provided. The apparatus 50 may include or otherwise be in communication with a processor 70, a user interface 72, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates or other structure configured to store data (e.g., bits) that may be retrievable by a machine (e.g., a computing device). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70. In some embodiments, the memory device 76 may also or alternatively store content items (e.g., option sets, option combination rules, CAD drawings, template data and/or the like).

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a client terminal or service platform 40) adapted for employing embodiments of the present invention by further configuration of the processor 70 by instructions for performing the algorithms and/or operations described herein. In some cases, the processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an example embodiment in which the apparatus 50 is embodied as a server or some other network devices (e.g., the service platform 40), the user interface 72 may be limited, provided remotely (e.g., from a client terminal or another device) or eliminated. However, in an embodiment in which the apparatus is embodied as a client terminal, the user interface 72 may include, among other devices or elements, any or all of a speaker, a microphone, a display, and a keyboard or the like.

In an example embodiment, the processor 70 may be embodied as, include or otherwise control an options configurator 80 that may include an options manager 82, an interface manager 84 and an options resolver 86. The options manager 82, the interface manager 84 and the options resolver 86 may each be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the options manager 82, the interface manager 84 and the options resolver 86, respectively, as described below. Thus, in examples in which software is employed, a device or circuitry (e.g., the processor 70 in one example) executing the software forms the structure associated with such means.

A building information model 60 may provide accurately modeled 3D geometry in the form of BIM elements 62 and option selection instruction strings 66. This 3D master building information model may be stored in an options configurator or available to an options configurator 80 while being stored locally or remotely. An option selector 64 may provide interface manager 84 with instructions regarding presentation of a user interface for selecting the options for the master building information model 60. Option selection instruction strings 66 may provide instruction to the option selector 64 for providing the options to a user for selection. The options resolver 86 may implement option rules which may be stored in the options manager database 82 which dictate how options may be implemented in a specific building information model 60.

The output from the options configurator 80 and apparatus 50 may include an address specific 3D building information model 88, which can provide views (e.g., elevation views) and sheets (e.g., architectural plans, build sheets, construction drawings, mechanical system layout drawings, etc.) 94, and files 92 for computer-numerically-controlled or otherwise automated production of building components, such as roof trusses or wall sections, for example.

Example embodiments described herein may address unlimited combinations of option sets to drive a database for inclusion in a building information modeling (BIM) solution. Embodiments allow a user to see all of the variants of a building configuration in a visual 3D grid environment. A user may zoom in and focus on specific areas of the particular location or view in real time. Embodiments may enable a user to rotate and spin the building configuration in real time that results from the selected option choices. By working in a true 3D environment in a BIM software environment, a user can address building configuration variations in multiple systems including architectural, structural, HVAC, electrical, and piping. At the same time, users may be provided with the ability to quickly generate real time 3D building configurations for an entire structure, or only a portion of the building with all of these building systems intact. Embodiments enable a user to see the effect of changing structural framing based on various design options and how it may affect piping or ductwork system interaction.

FIG. 3 illustrates an example flowchart of a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory (e.g., memory 76) of an apparatus (e.g., apparatus 50) employing an embodiment of the present invention and executed by a processor 70 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 3 represents a block diagram flowchart of the method of an embodiment that generates the address location/lot specific 3D building parts. As shown, the depicted method begins at 102 with deriving all 3D BIM elements and parts from a BIM source model (e.g., 60 of FIG. 2), including 3D modeled BIM elements (e.g., 62 of FIG. 2). At 104, a determination may be made as to which 3D BIM elements have associated option rules, such as through referencing options manager database 82 of FIG. 2. Any relevant option rules may be considered by options resolver 86. An example embodiment of an option rule may include, for example, where a roof pitch of less than a predetermined amount may not be available in climates having the potential of a high snow load. Such a rule may be important to preclude a designer or builder from constructing a building with a low-pitch roof that may accumulate too much snow which may cause roof trusses to buckle under worst-case conditions. Therefore, option rules may be important factors in limiting options or enhancing options available when generating an address specific 3D building information model.

Referring again to FIG. 3, the depicted method may apply user selected option instruction strings, such as the option selection strings 66 of FIG. 2 derived from user selections at the option selector (e.g., option selector 64 of FIG. 2). The option instruction strings may be applied to option rules along with each of the determined 3D BIM elements at 106. In response, the options resolver (e.g., options resolver 86) may logically evaluate each of the associated option rules based on the values supplied (e.g., options selected and/or related values such as measurements or quantities) and modify 3D elements to generate an address specific 3D BIM model of the building at 108. This address specific 3D BIM model may be output as the fully resolved master building information model that presents no conflicts for mechanical systems or for the architectural layout of the building.

The address specific 3D BIM model of the building may be used to derive correctly oriented views of the resulting 3D BIM model at 110. Sheets for accurate construction documents (e.g., architectural building sheets/plans, mechanical system plan sheets, etc.) may be derived at 112 from the corresponding views of 110. At 114, accurate electronic CNC files may be generated for application-specific CNC machines or system for manufacturing of portions of the building from the resultant 3D BIM model. These views, sheets, and CNC files are accurately produced based on the options selected according to the option rules, and enable efficient construction to be performed without conflicts between various mechanical systems or architectural elements. Further, due to option rules that are referenced in the options resolver 86, potential code violations can be avoided and building design can be ensured to be commensurate with local codes, rules, covenants, etc. For example, option rules can be related to federal codes (e.g., fire safety, electrical safety, flood elevations), local codes (e.g., maximum building height), homeowner association covenants (e.g., maximum 3-car garage, no vinyl siding, etc.), or any other prevailing rules or codes which may be applicable to a specific address in which the address specific 3D BIM model is developed for.

Methods of some embodiments may begin with a base 3D model from which options may be added. However, according to some embodiments, the base 3D model is another iteration of an available option, where the base 3D model is an option selected by a user from among an array of options presented in, for example, a matrix of options for the base 3D building information model.

According to some embodiments, the options configurator described herein may be implemented in conjunction with Autodesk®'s Revit® product through its publicly available Applications Programming Interface (API) for providing 3D BIM elements 62. The API can be used to find and manipulate internal BIM elements 62 such as, for example, walls, floors, and roofs. Example embodiments may optionally use a database having a standard interface such as, for example, Standard Query Language (SQL), to store data that might need to be accessed outside of the BIM modeling environment. For example, a table of element categories that a material can be assigned to, a table of a company's material inventory with engineering values for structural analysis, a table of framing logic that control how walls or roofs are to be framed and assembled, a table of BIM elements 62 collected, for example floor and wall beams, a table of possible organizational group forming a company hierarchy that specific options might fall under.

Options Administrator

According to some embodiments, an Options Administrator feature may be implemented in cooperation with the above-described system. An Options Administrator may enable a user or group of users (e.g., a corporation) to define, organize, and maintain a master list of all available options. The users may have control of the availability of options from the top corporate level, down to individual plan assignments for specific subdivisions. FIG. 4 depicts an example of a production builder's organization from the corporate office at the top, to geographic regions which are then organized by divisions. Each Division in a specific location can establish various options available in communities or subdivisions within their local domain without forcing sibling divisions or regions above to offer such options or variants of those options. The embodiment of this organizational control may reside outside of the BIM/CAD software, enabling an estimator or product manager to setup and maintain a company's option organization without having to access the BIM/CAD software. The information may reside in a builder file (e.g., a ".bld" file), at a network location. When a new CAD project is created, the user may select and import the defined option data from the builder file into a local file, such as an extensible markup language (xml) file that will reside with the project file. The full functionality of this tool may be used by larger volume builders with extensive option libraries and plan inventories. For users that maintain a smaller number of options, the option management may take place at a project level, using the builder file only for basic settings.

According to the illustrated embodiment of FIG. 4, a typical hierarchy of a production builder organization is presented. The hierarchy may be used to establish building configurator option availability and valid values for configuration rules at each level of the corporate structure. Option rule values for specific options may vary across sibling divisions (i.e., divisions on the same hierarchy level) of the hierarchy. For example, Boston, Hartford, and Providence divisions may or may not offer the same options on a specific model of home. Values and options available and applicable at top levels may be inherited by child levels. Rules and values may not be inherited upward in the hierarchy by parent nodes. For example, an option for a four-car garage may be available in Lakeside Community (a subdivision), but not available for the buyer selection at Creekside subdivision, and not available at the broader Boston division of the production builder.

CAD Software Options Ribbon

Embodiments described herein may include a plug-in interface within an existing CAD software program and may provide a unique user interface, such as a menu bar or ribbon. FIG. 5 illustrates an example embodiment of various user interfaces including a ribbon as implemented with the Revit Building Information Modeling solution by Autodesk®. The ribbon may be accessed by the VisionREZ home button and may display all the necessary VisionREZ option tools. The "Options Tools" panel may provide the tools most commonly used to define, create, and modify options. The "View Tools" panel may contain grid specific tools ranging from generating and modifying the grid to creating the elevation and plan views of the individual grid cells. Embodiments may also include project administration tools, such as on the "Settings" panel, and reporting and BOM data export on the "Output" panel. The Grid Properties dialog used in this embodiment facilities the creation of user defined Grid controls which accommodate the display of various parts of geometry that will need to be combined into the final building. Such properties of the grid control may include for example, the number of columns and rows generated in the grid similar to an electronic spreadsheet along with the size of the resulting cells into which building geometry is modeled in 3D.

The options available for selection based on option selection instructions 66 via options selector 64, may be presented in a graphical user interface through interface manager 84 and user interface 72. The graphical user interface may provide a grid arranged in a 3D perspective as depicted in FIG. 6 to enable an intuitive manner of option selection by a user with immediate feedback as to the resultant combination of options.

According to some embodiments, the disclosed grid system may consist of multiple user defined and user named sub-grids that allow the user to organize their model data in the most efficient visual manner. At any time, this entire grid can be rotated to see the geometry affected on all levels of a building. FIG. 6 provides an illustration of a building model presented in the grid system described herein. Features of the system are described herein with respect to the aforementioned system.

VisionREZ Design Options

Embodiments may include an option management tool at the project level. This interface, as illustrated in FIG. 7, may be used to develop and manage options and option combinations within the CAD project. In the options tab, predefined options can be built from scratch within the active CAD project or imported from the options editor. This may include individual options and option sets, which may be mutually exclusive groups. In the Options Combination tab, conditional criteria can be defined for option combinations. The rules may prompt the assembly of the lot or specific grid model with builder and supporting options. Future development may include the ability to import option definitions from other .xml files.

Option Editor

The Option Editor interface may be used to define each individual option. In addition to its name and type, the option may be assigned a category to allow for filtering. From the rules tab, additional options can be enabled, excluded, or included. The included feature may allow for the development of Chain Options where a single option can launch a series of supporting options. A mapping tab may be active for all parametric options, where the user can assign the geometry or annotations being modified by the defined option.

Option Selector

An option selector interface may be used to choose individual options available on the Model being designed. The selection of one option can have the effect of hiding other conflicting options from the users selection thus minimizing discretionary choices of options that simply cannot be constructed in combination with other selected options. In addition, selection of certain options in this dialog will enable and make visible additional options that become available based on prior selections. For example selecting the Deluxe kitchen may now enable cherry, oak, or maple cabinets and various countertop materials previously not available for selection when the Basic Kitchen was selected.

Option Types

Structural options may be included to reflect builder options that add geometry to a lot specific model. To take advantage of the power of the existing CAD software parametrics, multiple parametric options may be implemented, as depicted in FIG. 8. These options may be used to manipulate the structural options without having to add new geometry. Parametric options may include, but are not limited to:

a. Optional elements, such as insertion of a new window or a cathedral ceiling in the model which significantly affects existing 3D elements;

b. Level modification options, which refer to modification of the ceiling height for Level 1, or Building Story 1, for example from 8', to 9', to 10' ceiling heights which significantly revise the 3D geometry of the walls and brick siding and necessitates the moving of upstairs walls, floors, and roofs to a higher position in the model in order for the solve model to be complete accurate in 3D;

c. Parameter revisions, which change the property on a building part such as making a Wall load bearing based on selected options, or changing the bottom plate material of a wall to treated lumber when a slab foundation option is selected elsewhere in the selection interface;

d. Family type revisions, which facilitate swapping out a 3050 window for a 3060 window or swapping the Wall Style from a 2×4 Frame Construction with Brick to a 2×6 Frame Construction with Vinyl siding, significantly modifying the resulting geometry and material requirements;

e. Move element options, which enlarge a room by moving a wall, for example, or move a window in order to insert a fireplace; and f. Annotation options, typically used to revise notes on floor plans and elevations when the referenced geometry has been changed by the configurator. For example, a note with a leader on an Elevation view may point to the wall and state 'Brick Veneer' but upon selection of a Wall Family that changes the subject wall to have vinyl siding, the aforementioned note with leader must be revised to reflect the new configuration of the model. Embodiments of the described solution automate this annotation revision.

Options Grid

The Options Grid may be the primary option workspace, allowing a user a full overview of builder and supporting options. Structural options may be defined in each cell, represented by the respective option ID and name, as depicted in the grid of FIG. 9. The grid information may appear on all levels within a project so the option can be identified and defined at each level. The grid size and layout may be defined by the user. Resizing and grid management tools may be included to allow for future project expansions as indicated in FIG. 3. Multiple grids may be supported within the workspace as illustrated in FIG. 8

Grid Tools

For master bid sets, as illustrated in FIG. 10 views are often required to represent options and option combinations. The grid cell visibility tool provides the user the ability to solve a full or partial model based upon selected options within a grid cell. The grid view tools can then be used to generate elevation and plan views of selected cells. These dependent views may be listed in the project browser under the selected grid cell name, ready for construction documentation and sheet placement. Additional grid tools include resizing the grid cells and adding/removing grid columns and rows. Embodiments may further include automatic annotations for generated views, automatically generated option sheets based upon a preset grid, and working views in a template. FIG. 11 illustrates an enlarged illustration of one of the many views which may be generated during operation 110 of FIG. 3.

Lot Specific Plan Set

The option workspace of example embodiments may include a lot specific model solve area, as shown at center of FIG. 12 where the fully solved model is generated. The options selection tool, an embodiment of which is depicted in FIG. 5 may be used to solve the lot specific model in the designated location based upon selected options. The standard option template may include preconfigured plan and elevation views of the lot specific box. The sheets for lot specific bid sets may be preconfigured with these views. Therefore the construction documents may be auto-populated with the lot specific information as the model is solved. Similar to the Grid Tools, embodiments may further include automatic annotations for generated views as depicted in FIGS. 10, 11, and 15, automatically generated option sheets as depicted in the pictorial workflow shown in FIG. 15 which are based upon a preset grid, working views in a template, and the selected options.

FIG. 13 depicts an example embodiment of an exploded view of a house that has been constructed in a virtual 3D BIM. While the embodiment of FIG. 13 is a simplification, the depicted embodiment illustrates such elements as an optional garage bay 210 extending from the left side of the house 212. Each exploded element may be an option or a group of options that is selectable from, for example, the grid of FIG. 9. According to some embodiments, a basic model, such as a standard house floor plan may be provided, while options may be a series of features selectable through a grid user interface to customize the house to a buyer's wants. FIG. 14 depicts the house of FIG. 13 assembled in an isometric view which may be used to illustrate to a customer how the finished product will appear.

FIG. 15 illustrates the various views that may be derived from the resolved 3D geometry of the BIM as shown at element 110 of FIG. 3. The views generated may include the standard illustrated views, such as floor plan views, front, rear, and side elevation views, along with any additional views that may be desirable. Construction document sheets may also be derived from the accurate model views, as shown in FIG. 15 reflecting element 112 of FIG. 3. The list of views and/or sheets may be provided in a list view as shown in FIG. 16, any or all of which may be expanded as necessary. For example, list element A-5.00 depicting the interior elevations may include interior elevations for each room, such that expansion of element A-5.00 may list a further plurality of sheets. Embodiments provided herein may further provide views used for marketing, as shown in the list of FIG. 16.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A computer-implemented method of generating a building information model within an options configurator application, the method comprising:

deriving three-dimensional building information model elements, wherein each of the building information model elements is part of an option set for a building;

causing a display device to display the building information model elements in an options grid of an options configurator application, wherein the options grid includes a plurality of cells, wherein each building information model element is presented in a respective cell of the options grid via a graphical user interface, and wherein each of the plurality of different cells of the options grid corresponds to a different building information model element of the option set that is selectable for including in the building;

associating one or more option rules with the building information model elements presented in the options grid, each option rule comprises a location specific option rule that defines a different available option based on a specific location of the building associated with the building information model;

receiving selection, via user input, of two or more building information model elements of the building information model elements presented in the options grid;

applying the one or more location specific option rules associated with one of the selected building information model elements to the respective one of the selected building information model elements; and combining and modifying the selected building information model elements to generate a location specific building information model.

2. The computer-implemented method of claim 1, further comprising:

deriving one or more views of the generated location specific building information model.

3. The computer-implemented method of claim 1, further comprising:

deriving plans for one or more mechanical systems of the generated location specific building information model.

4. The computer-implemented method of claim 1, further comprising:

deriving one or more application-specific computer-numerically-controlled files for manufacturing one or more components of the building information model.

5. The computer-implemented method of claim 1, wherein the one or more location specific option rules comprises a restriction on an interface between the selected building information model elements.

6. The computer-implemented method of claim 1, wherein the options grid comprises two or more grids each presented as a level presented in a three-dimensional stacked arrangement, wherein each level of the three-dimensional stacked arrangement is a story of the building.

7. The computer-implemented method of claim 1, wherein combining and modifying the selected building information model elements comprises:

modifying the respective one of the selected building information model elements according to the associated one or more location specific option rules; and combining the respective one of the selected building information model elements with the one or more selected building information model elements to generate the location specific building information model.

8. The computer-implemented method of claim 1, further comprising:

simulating energy usage of the building information model based on a geometry of the three-dimensional model, geolocation information, and a building orientation relative to solar paths.

9. The computer-implemented method of claim 1, wherein the location specific option rule comprises an address specific option rule that defines a different available option based on a specific address of the building associated with the building information model.

10. A method executable by a processor comprising:

receiving an indication of a hierarchical structure of building information model element options applicable to an enterprise;

receiving one or more options rules defining relationships between building information model element options within the hierarchical structure, each option rule comprises a location specific option rule that defines a different available option based on a specific location of a building associated with the building information model element options; and causing a display device to display a visual representation of the building information model element options, wherein the visual representation comprises two or more arrays of a plurality of different cells presented in a stacked, three-dimensional view, wherein each different building information model element option is presented in a different respective cell of the two or more arrays, and wherein each different building information model element option is a selectable option for including in the building.

11. The method of claim 10, wherein in response to a first building information model element option from a first one of the two or more arrays of cells being selected and a second building information model element option from a second one of the two or more arrays of cells being selected, generating an assembled three-dimensional location specific building information model of the building including the first building information model element option and the second building information model element option.

12. The method of claim 11, further comprising:

simulating energy usage of the assembled three-dimensional location specific building information model based on a geometry of the three-dimensional model, geolocation information, and a building orientation relative to solar paths.

13. The method of claim 11, further comprising:

generating at least one of a plumbing model, an electrical model, or a duct work model, for the assembled three-dimensional location specific building information model in response to the first building information model element option and the second building information model element option being selected.

14. The method of claim 13, wherein in response to a third building information model element option from the first one of the two or more arrays of the plurality of different cells being selected:

generating an assembled three-dimensional location specific building information model of a building including the third building information model element option and the second building information model element option, and generating a revised version of the plumbing model, the electrical model, or the duct work model.

15. The method of claim 10, wherein the building plan options presented in the two or more arrays of the plurality of different cells are determined in response to building options previously selected.

16. The method of claim 10, wherein each of the two or more arrays of the plurality of different cells represents a building level, wherein the two or more arrays are presented in a stacked, three-dimensional view indicative of the relative position of the building levels with respect one another.

17. The method of claim 10, further comprising solving for at least one of a plumbing model, an electrical model, or a duct work model, for each combination of building information model element options presented in the two or more arrays of the plurality of different cells.

18. The method of claim 10, wherein the location specific option rule comprises an address specific option rule that defines a different available option based on a specific address of the building associated with the building information model.

* * * * *